(No Model.)  4 Sheets—Sheet 1.

O. J. CHILDS.
HARROW.

No. 546,224. Patented Sept. 10, 1895.

WITNESSES:
C. L. Bendixon
J. J. Laass

INVENTOR:
Orlando J. Childs
By Duell, Laass & Duell
his ATTORNEYS.

(No Model.) 4 Sheets—Sheet 2.

O. J. CHILDS.
HARROW.

No. 546,224. Patented Sept. 10, 1895.

WITNESSES:
C. L. Bendixon
J. J. Laass

INVENTOR:
Orlando J. Childs
By Dodd, Laass & Dull
his ATTORNEYS.

(No Model.) 4 Sheets—Sheet 3.

O. J. CHILDS.
HARROW.

No. 546,224. Patented Sept. 10, 1895.

WITNESSES:
C. L. Bendixon
J. J. Laass

INVENTOR:
Orlando J. Childs
By Duell, Laass & Duell
his ATTORNEYS.

(No Model.) 4 Sheets—Sheet 4.
O. J. CHILDS.
HARROW.

No. 546,224. Patented Sept. 10, 1895.

WITNESSES:
C. L. Bendixen
J. J. Laass

INVENTOR:
Orlando J. Childs
By Duell, Laass & Duell
his ATTORNEYS.

UNITED STATES PATENT OFFICE.

ORLANDO J. CHILDS, OF UTICA, NEW YORK, ASSIGNOR TO THE NATIONAL HARROW COMPANY, OF NEW JERSEY.

HARROW.

SPECIFICATION forming part of Letters Patent No. 546,224, dated September 10, 1895.

Application filed October 19, 1892. Serial No. 449,308. (No model.)

*To all whom it may concern:*

Be it known that I, ORLANDO J. CHILDS, of Utica, in the county of Oneida, in the State of New York, have invented new and useful Improvements in Harrows, of which the following, taken in connection with the accompanying drawings, is a full, clear, and exact description.

This invention relates to the class of harrows which are equipped with curved spring-teeth pivotally connected to the frame, so as to allow the teeth to be set with their points or free ends a greater or less distance beneath the frame and into a more or less inclination to the ground, and by means of a lever fulcrumed on the frame and connected with the pivoted supports of the teeth the latter are adjusted and sustained in their desired positions.

The object of my present invention is to so connect the teeth to the frame as to allow the outer curved surfaces of the teeth, adjacent to the attached end thereof, to be more readily utilized as fulcrums upon which to lift the harrow-frame and carry the points of the teeth out of the ground while drawing the harrow to and from the field and also relieve the teeth-adjusting rods and lever from strain exerted on the teeth when in operation, and the object, furthermore, is to tie the teeth-adjusting bars more securely together; and to that end the invention consists in the improved construction and combination of parts hereinafter described, and specifically set forth in the claims.

Figure 1:
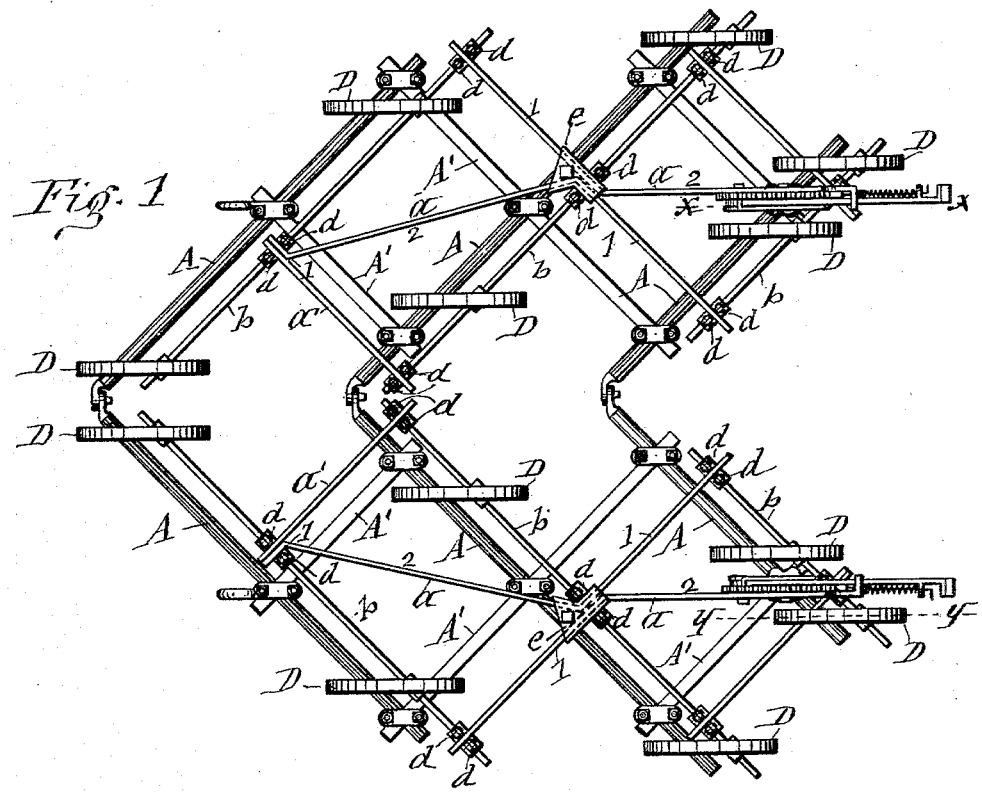
Figure 2:
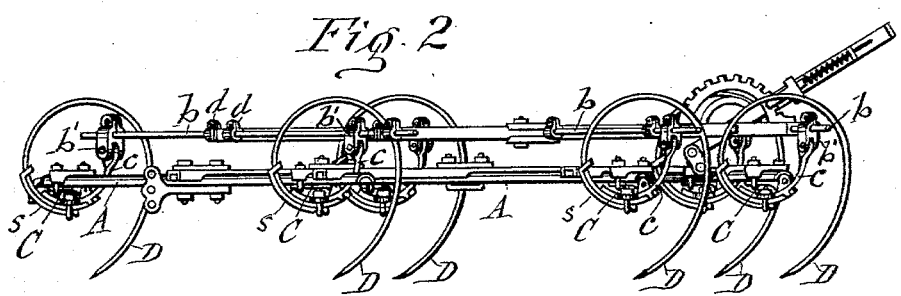
Figure 3:
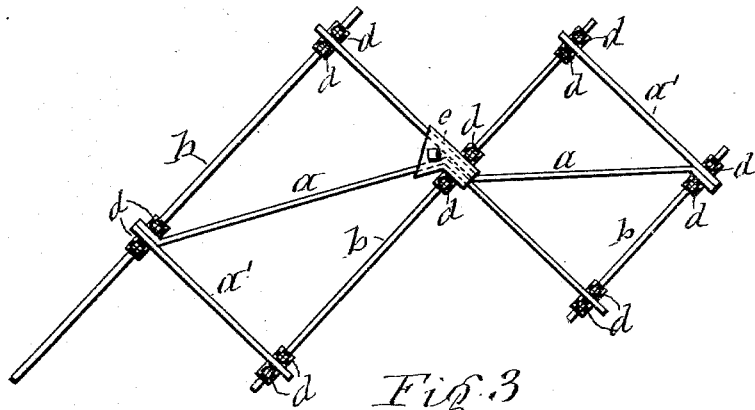
Figure 4:
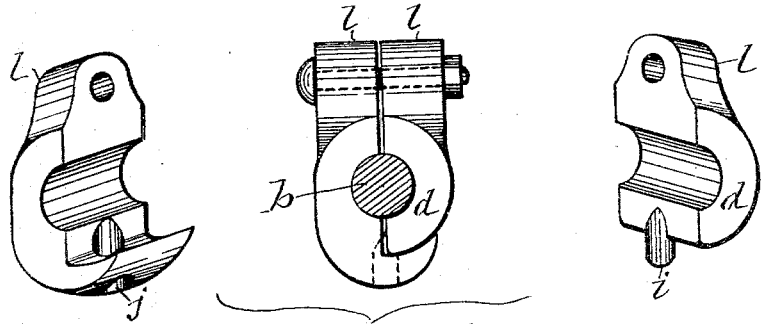
Figure 8:
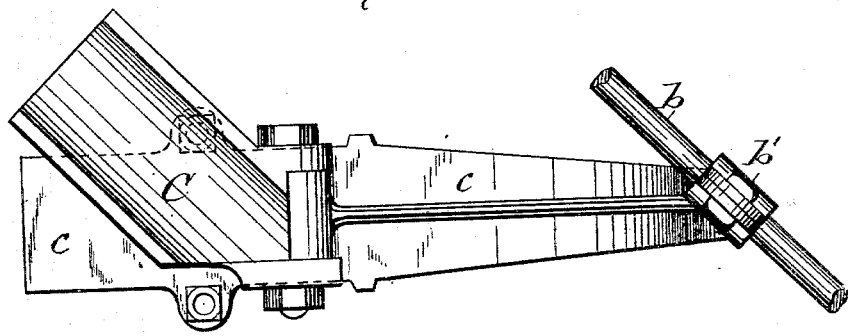
Figure 5:
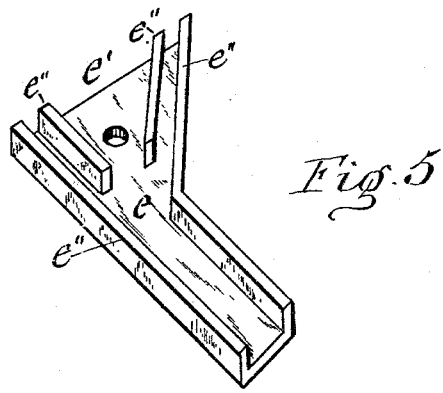
Figure 7:
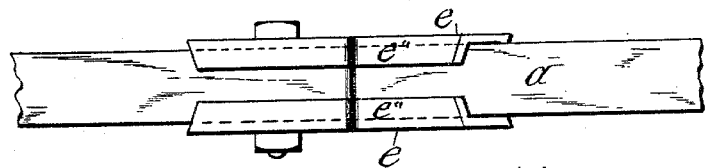
Figure 6:
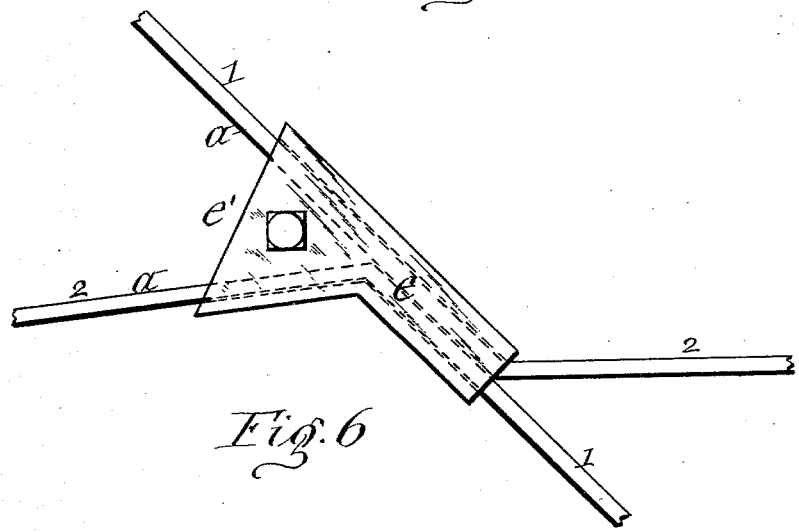
Figure 9:
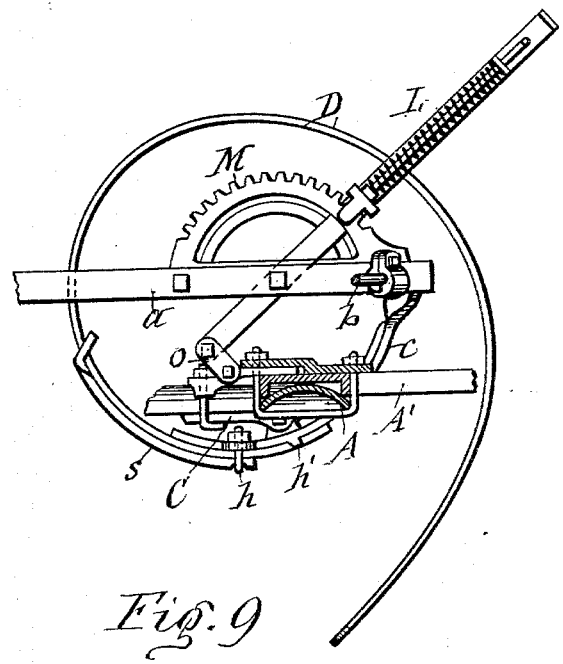
Figure 10:
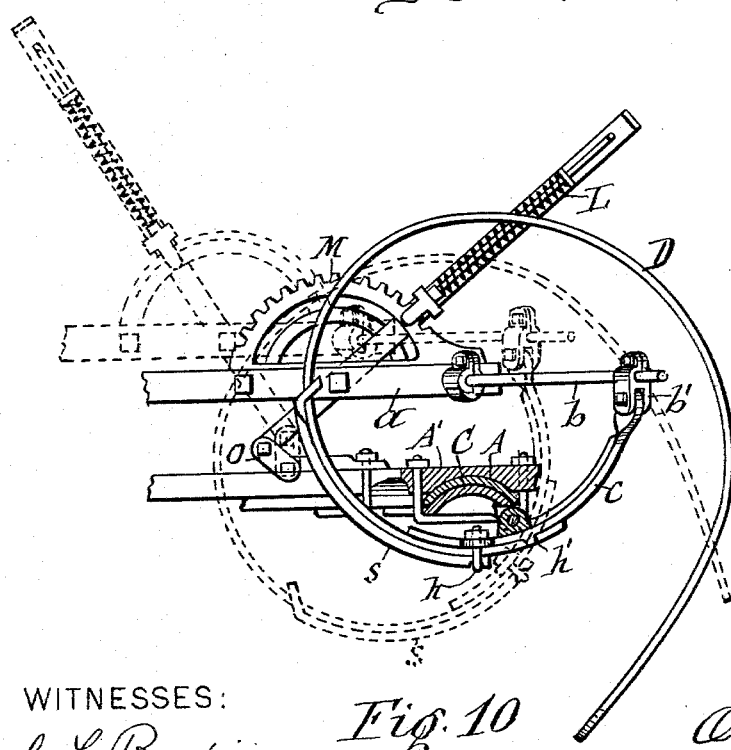

In the annexed drawings, Figure 1 is a plan view of a harrow embodying my improvements. Fig. 2 is a side elevation of the same. Fig. 3 is a plan view of the bars by which the teeth-carrying arms are coupled together and adjusted simultaneously. Fig. 4 is an enlarged detail view of one of the clamps which confine the longitudinal adjusting-bars in their requisite positions on the transverse rods which couple together the teeth-carrying arms. Fig. 5 is an enlarged detached perspective view of one of the tie-plates used for the aforesaid purpose and at the same time bracing said bars. Fig. 6 is a plan view of said tie-plate applied to the bars. Fig. 7 is a side view of the same. Fig. 8 is a plan view of the attachment of the tooth-carrying arm to the frame. Fig. 9 is an enlarged vertical longitudinal section on line $xx$ in Fig. 1, and Fig. 10 is an enlarged vertical longitudinal section on line $yy$ in Fig. 1.

Similar letters and numerals of reference indicate corresponding parts.

A and A' represent the draft and cross bars, which are arranged obliquely to the line of draft and are securely fastened to each other to form the harrow-frame. Said bars may be of any desired shape in cross-section, and the particular means of tying them together is immaterial to my present invention. To the under side of said frame, preferably the draft-bars thereof, are firmly fixed the plates C C by means of clips or other suitable fastening devices, and to the under side of each of said plates is hinged axially at right angles to the line of draft an arm $c$, which extends both forwardly and rearwardly, with an upward curvature to correspond to the curvature of the attaching end of the curved spring-tooth D and to extend with its rear end above the frame. The tooth D is fastened to the exterior or under side of the arm and in front of the pivot, preferably by means of a clip $h$, placed astride the tooth-shank and passing with its ends through ears formed on the arm $c$ and provided with nuts by which the tooth is securely clamped on the arm. To guard against lateral displacement of the tooth the arm $c$ is formed with lugs $h'$, which abut against opposite edges of the tooth. The attached portion of the tooth is thus entirely beneath the frame and in front of the fulcrum of the tooth and the draft-bar is within the curve of the main portion of the tooth. The result is that the strain exerted on the point of the tooth is transmitted to the harrow-frame in such a manner as to relieve the teeth-adjusting rods and lever from strain, and by a comparatively slight turning of the tooth on its fulcrum the longer sweep of the tooth is thrown under the frame sufficiently to bear on the ground and serve as a fulcrum for lifting the frame and throwing the point of the tooth out of the ground. The tooth then serves the purpose of a runner upon which to move the harrow to and from the field.

In order to turn all the teeth simultaneously, as aforesaid, the teeth-carrying arms $c$ $c$ are connected together transversely in sets by means of transverse rods $b$ $b$ $b$, which are coupled to said arms by means of links $b'$ $b'$, which obviate binding or cramping of the connections in the operation of turning the teeth, as aforesaid. The aforesaid rods are also coupled together by means of longitudinal bars $a$ $a$ and $a'$ $a'$, which are flat or rectangular in cross-section and placed edgewise vertically and perforated to receive the rods through them. The two short bars $a'$ $a'$ couple the ends of the front and rear rods $b$ $b$ to the central rod and the long main bars $a$ $a$ couple the center of the central rod $b$ to the end portions of the front and rear rods, as more clearly shown in Fig. 3 of the drawings. Each of these main bars is formed with its central and two end portions 1 1 parallel with each other and at right angles to the rods $b$ $b$ $b$, and with an oblique intermediate portion 2, which is disposed diagonally in relation to the aforesaid rods, which pass through eyes in the longitudinal bars, as hereinbefore described.

In order to prevent the longitudinal bars from moving laterally on the rods, I secure to the rods the clamps $d$ $d$ at opposite sides of the longitudinal bars. These clamps I prefer to form of diametrically-divided sections, which are detachably connected with each other at one end by a lug $i$ on one section, interlocking with an eye $j$ in the other section, as shown in Fig. 4 of the drawings. The opposite end of each section is formed with a perforated ear $l$ for the reception of the bolt, by which the clamp is fastened to the rod $b$. Said construction allows the clamp to be applied to or removed from the rod when required without disturbing the longitudinal bars.

The main bars $a$ $a$ lie with their central portions contiguous to each other and, in order to firmly tie them together and at the same time brace them, I apply to the tops and bottoms of said portions of the bars the tie-plates $e$ $e$, each of which is formed with the flaring end $e'$ and with the flanges $e''$ $e''$, which engage the sides of the bars. The flaring ends of the tie-plates are perforated, as shown in Fig. 5 of the drawings. A bolt passing through the perforations fastens the tie-plates to the bars.

To the harrow-frame, preferably at the rear end thereof, is connected a lever L, by means of a toggle or link $o$, which allows the lever to accommodate itself more freely to the movement of the longitudinal bar $a$, to which the lever is pivotally connected.

By throwing the free end of the lever rearward, as shown by full lines in Fig. 10 of the drawings, the longitudinal bars $a$ $a$ $a'$ $a'$ are drawn rearward, and by their connection with the arms $c$ $c$, by means of the rods $b$ $b$, the teeth D D are set into the requisite position to cause the points of the teeth to enter the ground, and by throwing the lever L forward, as represented by dotted lines in Fig. 10 of the drawings, the teeth are set into such a position as to carry the longer sweeps or less curved portions of the teeth under the frame and bring said portions of the teeth to bear on the ground, so as to lift the frame and throw the points of the teeth out of the ground, in which condition the harrow is moved to and from the field.

M denotes a notched quadrant, with which engages a dog connected to the lever L and serves to retain said lever in its desired position. I attach said quadrant to the longitudinal bar $a$, and thus lock the lever more remote than usual from its fulcrum, thereby affording a more secure hold for the lever.

It will be observed that by hinging the arm $c$ close to the under side of the frame, extending said arm rearward and upward, and carrying the tooth D forward and over the frame and then downward under the frame, as shown, I greatly relieve the bars $b$ $b$ and lever L from the strain exerted on the tooth when the harrow is in use.

To protect the teeth from wear and abrasion in drawing the harrow to and from the field, as aforesaid, I attach to the exteriors of the teeth the shoes $s$, by which the teeth ride upon the ground.

What I claim as new is—

1. In a harrow the combination with the main frame of a spring harrow tooth having a curved runner portion forward of its point, a shoe secured to said runner portion a tooth holding clip engaging the tooth and pivotally connected to the harrow frame, in rear of said shoe, said clip having a part extending upward in rear of said pivotal connection and adjusting mechanism connected to said upwardly extending part, whereby when the point of the tooth is elevated the shoe will be lowered into contact with the ground substantially as described.

2. In a harrow the combination with the frame bars, of a spring tooth having a curved runner portion forward of its point, a tooth clip pivotally connected with the frame and engaging the tooth in rear of said runner portion, a shoe engaging said runner portion, a securing device for clamping said shoe, tooth and clip, together, said clip having an upwardly extending arm in rear of its point of pivoting and adjusting devices connected with said arm, whereby when the point of the tooth is elevated the shoe will be lowered into contact with the ground, substantially as described.

3. In combination with the teeth-carrying arms —$c$—$c$— and rods —$b$—$b$— connecting said arms transversely in sets, the longitudinal bars —$a$—$a$— formed with corresponding central and end-portions at right angles to the aforesaid rods and with intermediate portions disposed diagonally in relation to said rod, said longitudinal bars having their central portions contiguous to each other and perforated for the reception of the rods through them, and the tie-plates —e—e— placed on the tops and bottoms of the central portions of the longitudinal bars and formed with the flaring end —e'— and with flanges —e''—e''— engaging the sides of said bars and perforations —e'''— in the flaring end —e'— and the bolt —f— passing through said perforations and clamping the plates on the longitudinal bars, substantially as set forth and shown.

4. In combination with the teeth carrying arms —c—c—, rods —b—b— connecting said arms transversely in sets, and the longitudinal bars —a—a—, perforated and receiving the aforesaid rods through them, the clamps —d—d— each formed of diametrically divided sections interlocked with each other at one end and provided with perforated ears at the opposite end, and a clamping bolt passing through said ears, substantially as described and shown.

In testimony whereof I have hereunto signed my name this 15th day of October, 1892.

ORLANDO J. CHILDS. [L. S.]

Witnesses:
H. M. SEAMANS,
J. J. LAASS.